Feb. 2, 1971 B. CHIRON 3,560,892

MICROSTRIP DEVICES HAVING STRIP CONDUCTOR COATED ON FERRITE SUBSTRATE

Filed Nov. 29, 1968 4 Sheets-Sheet 1

3,560,892

MICROSTRIP DEVICES HAVING STRIP CONDUCTOR COATED ON FERRITE SUBSTRATE

Bernard Chiron, Paris, France, assignor to Societe Lignes Telegraphiques et Telephoniques, Paris, France, a joint-stock company of France Filed Nov. 29, 1968, Ser. No. 780,120
Claims priority, application France, Dec. 6, 1967, 131,090
Int. Cl. H01p 5/12, 1/32
U.S. Cl. 333—1.1 3 Claims

ABSTRACT OF THE DISCLOSURE

Wide band microstrip devices are designed as conductive films deposited on a ferrite substrate material chosen such that the real component of the permeability is a decreasing function of the frequency in the operating frequency range.

BACKGROUND OF THE INVENTION

It is well known the miniaturization of the microwave circuit is a user's requirement which becomes more and more stringent. Both bulk and weight of the devices are to be drastically reduced. In order to meet these conditions circuits have been designed which are based on the property of metallic films to guide microwave energy. The microstrip circuit consist of a ribbon-like conductive coating deposited on a dielectric substrate. Other strip-line designs incorporate two external conductive plates placed respectively under the dielectric substrate and above a dielectric layer placed on top of the conductive strips. The present invention is related to the first type of strip circuits.

To obtain two dimensional microwave circuits showing nonreciprocal characteristics, use is made of ferrite as for three dimensional circuits. Strip line circuits using ferrites have already been described as for instance in U.S. Pat. 3,289,115—Carr concerning a strip-line phase shifter consisting of an S-shaped conductive strip coating on a ferrite substrate. The nonreciprocal effect is based on the gyromagnetic resonance property of the ferrite. Such a property is highly selective (that is frequency sensitive) and the corresponding device shows also a highly selective characteristic. It is the principal object of the present invention to provide nonreciprocal strip-line microwave circuits with wide band characteristics. By wide band is meant at least one octave.

More precisely the present invention concerns a wide band strip-line nonreciprocal device and any combination thereof. Nonreciprocal strip-line devices are well known per se as may be ascertained by reference to an article published in the Proceeding of the Institution of the Electrical Engineers (GB), vol. 104, 1957, Part B supp. 6, and entitled, "A Resonance Absorption Isolator in Microstrip for 4 gc./s.," by L. Lewin. The isolator consists of a main strip coated on a dielectric substrate. At a given point along the strip an area of circular polarization of the wave is created by a first stub. A matching stub opposite said first stub may be added. A ferrite piece is inserted in the substrate under the main strip at the point of circular polarization and a suitable external magnetic field is established at said location. As may be seen in FIG. 2 of the article, the device is selective.

Ferrite materials having frequency-sensitive permeability are known. Ferrite materials with decreasing permeability are described in the "Handbook of Microwave Ferrite Materials," by Von Aulock published by Academic Press at p. 518 of the 1965 edition.

The present invention is based on the discovery that the use of ferrite material having a permeability which decreases with the frequency as a substrate for strip-line circuits allows for wide band operation of the nonreciprocal devices.

BRIEF SUMMARY OF THE INVENTION

The circuits according to the present invention consist of a ferrite substrate of a proper material which shows a decreasing permeability with respect to the frequency in the operating frequency range. The substrate is coated with a main metallic strip and a first stub proportioned so as to establish an area in the main strip where the propagating wave is circularly polarized. A matching stub is preferably located opposite the first stub along the main strip. The external magnetic field is adjusted according to the type of circuit concerned. If the field is less than the resonance value, the device acts as a nonreciprocal phase shifter. If the field value is greater than the resonance value, the device functions as an isolator. The following description and the appended drawings are related to an isolator and to the combination of three phase shifters to constitute a circulator.

DETAILED DESCRIPTION OF THE DRAWINGS

Figure 1:
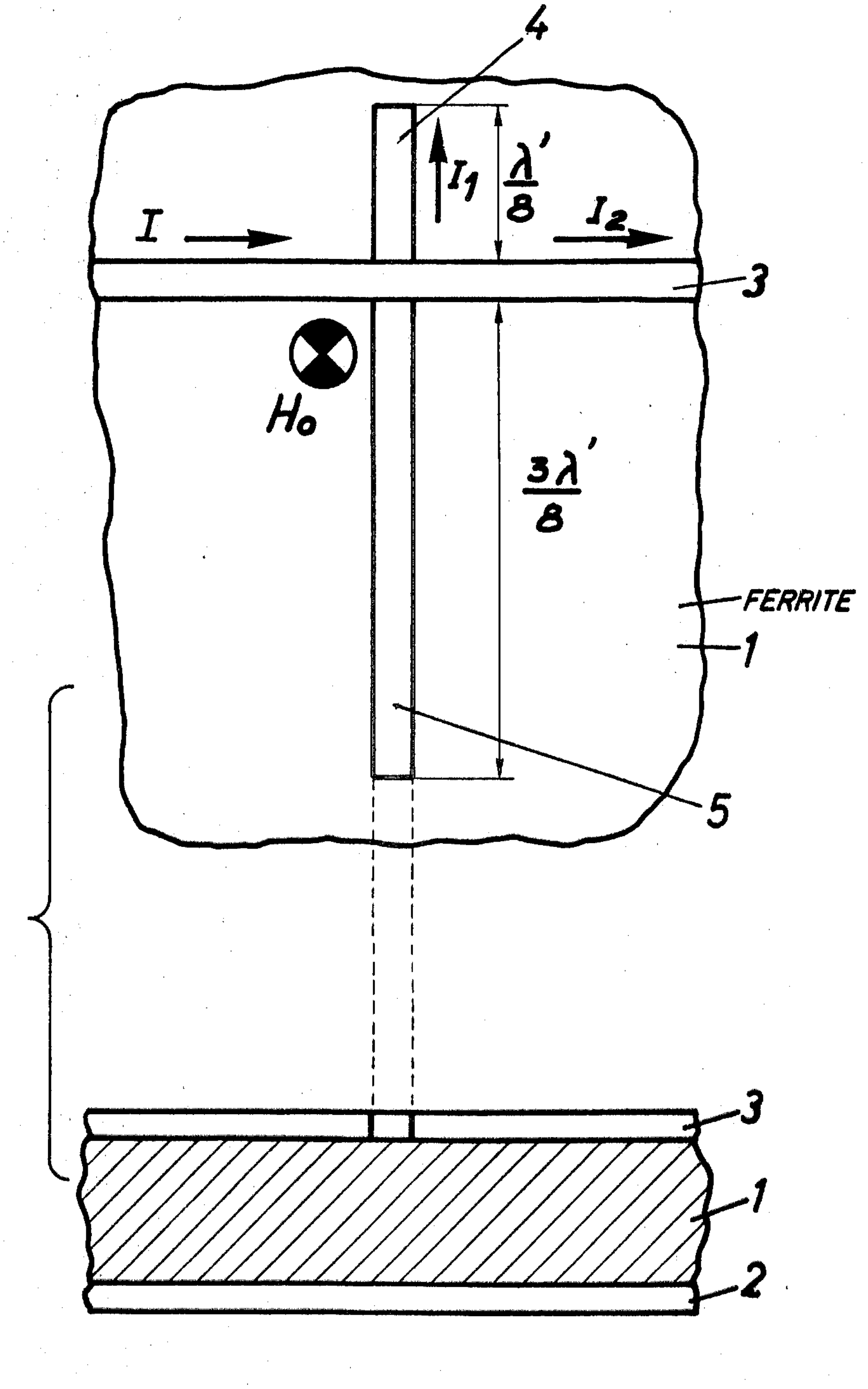
FIG. 1 is a top plan and sectional view of an isolator in accordance with the present invention.
Figure 2:
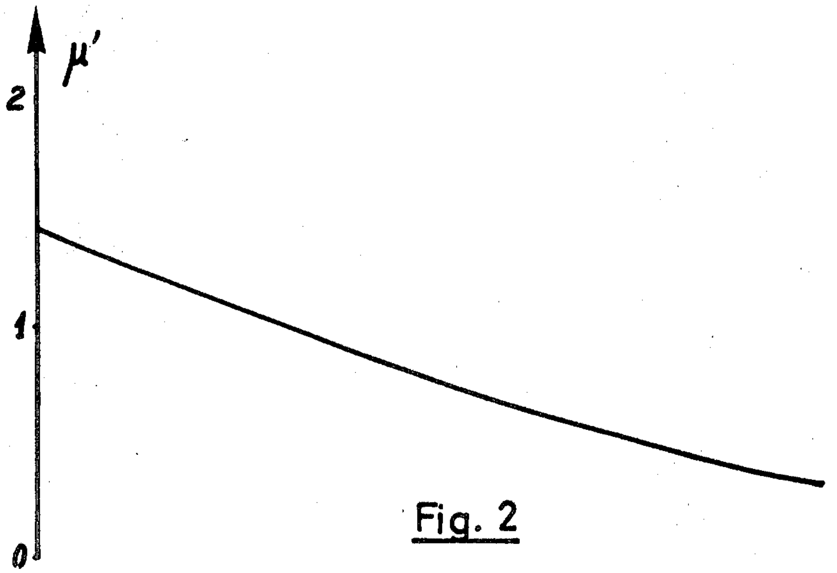
FIGS. 2 and 3 are graphs showing the electrical characteristics of the isolator.
Figure 3:
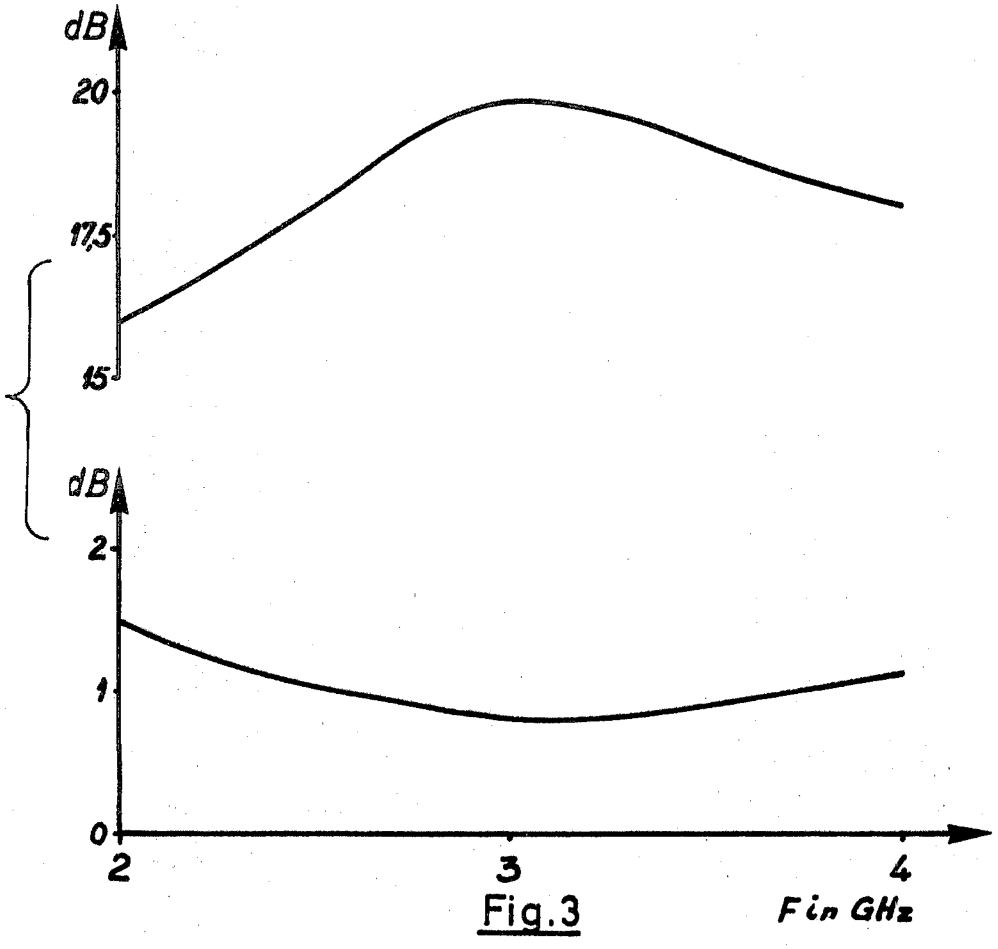

FIG. 1 represents a top plan and a sectional view of the simplest circuit design according to the invention. The ferrite substrate 1 is coated on one of its faces with a continuous metallic film 2. This conductive coating is intended for grounding purposes and also for elimination of the heat. The upper face of the substrate carries the conductive strip line circuit consisting on the main strip 3, the polarization controlling strip 4 and the matching strip 5 (or inversely). The thickness of these strip conductors is a few tenths of mm. and they consist of a silver layer deposited on an underlayer of gold 2 mm. wide. Connectors, not shown, are connected at opposite ends of the main strip 3. When the associated circuitry is also of the strip line type, direct connection between the strips is preferred for sake of weight and cost. The active part of the circuit is limited to the crossing area of strips 3, 4, 5. It is not necessary to explain in detail how the stub changes the polarization of the wave propagating along strip 3. As shown in the figure the phase shifting electrical length should be an odd multiple of one-eighth of the wave length. The length of the matching stub is such that the overall electrical length of 4 and 5 is a multiple of half the wavelength. These values assume that the characteristic impedance of the main strip and the stubs are equal, that is, that their geometrical widths are equal. The mathematical analepis of the circuit is given in the article written by Lewin already mentioned above. The overall dimensions of the device can be limited almost to the active part of it; this allows for very small circuits. The characteristics in FIG. 3 correspond to an isolator obtained with a substrate made of a ferrite sold by Lignes Telegraphiques et Telephoniques, Paris, France, under the type number 6303. The variation of the permeability of this material with frequency is shown in FIG. 2 in the 2 to 4 gHz. range. The characteristics in FIG. 3 are obtained with an applied magnetic field near the resonance field of 1000 oersteds. As can be seen direct an attenuation varies between 1.4 and .8 db in the 2 to 4 gHz. band. Inverse attenuation is maintained between 16 and 20 db in the band. The direction of easy propagation depends on the orientation of the applied magnetic field.

Figure 4:
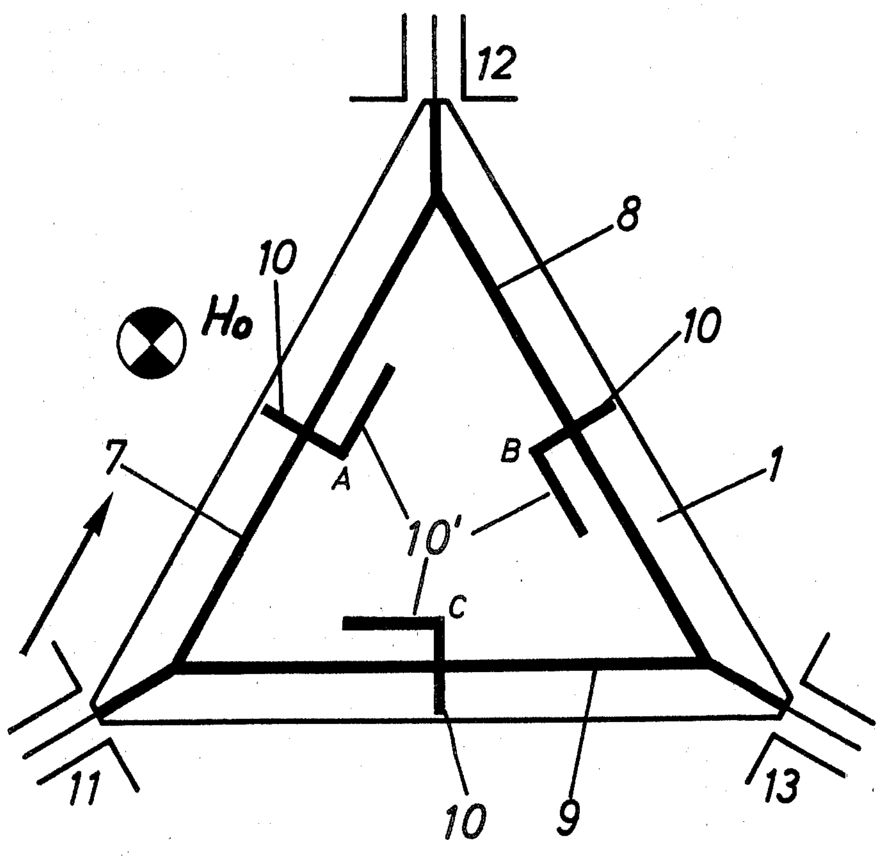
FIG. 4 shows a circulator in accordance with the present invention.
Figure 5:
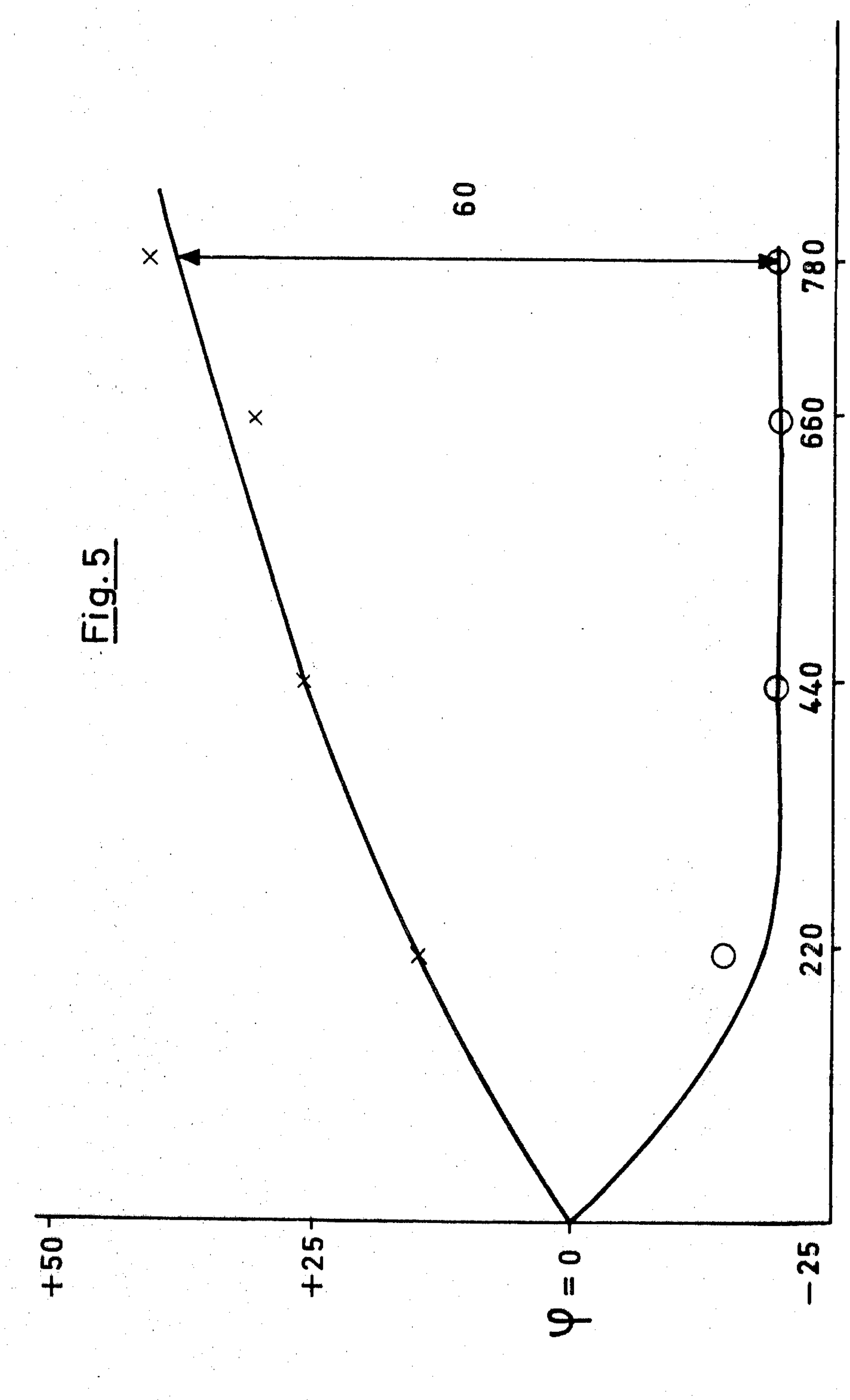
FIG. 5 is a graph showing the characteristics of the circulator of FIG. 4.

The same structure as shown in FIG. 1 under a magnetic field weaker than the resonance value will operate as a nonreciprocal phase shifter, the phase shift depending on the magnetic field value. A 2.5 mm. wide strip design has provided direct phase shifts reaching 60° before resonance. FIG. 4 shows three such phase shifters associated to build up a circulator. The three main strips are shown respectively at 7, 8 and 9. The three polarization controlling stubs are shown at 10 and the matching stubs at 10'. They have been folded at A, B, and C in order to reduce the overall dimensions. Three connectors are shown at 11, 12, 13. The field establishing device is omitted. FIG. 5 shows the phase shifting characteristic of one of the three elemental phase shifters at 3.2 gHz. with respect to the applied magnetic field value. The 60° value is reached, which is necessary to the operation of the device as a circulator.

What is claimed is:

1. A wideband microstrip isolator comprising:
a substrate of ferrite material having a permeability which is a decreasing function of the applied frequency;
a main strip conductor coated on said substrate;
a first stub strip conductor coated on said substrate and intersecting said main strip for circularly polarizing a wave propagated along said main strip conductor;
a second stub strip conductor coated on said substrate and intersecting said main strip for canceling the impedance of said first stub as seen from said main strip conductor; and
means for establishing a magnetic field at the intersection of said main and stub strips which is stronger than the resonance field of said ferrite material.

2. A wideband microstrip phase shifter comprising:
a substrate of ferrite material having a permeability which is a decreasing function of the applied frequency;
a main strip conductor coated on said substrate;
a first stub strip conductor coated on said substrate and intersecting said main strip for circularly polarizing a wave propagated along said main strip conductor;
a second stub strip conductor coated on said substrate and intersecting said main strip for canceling the impedance of said first stub as seen from said main strip conductor; and means for establishing a magnetic field at the intersection of said main and stub strips which is weaker than the resonance field of said ferrite material.

3. A wideband microstrip circulator comprising:
a substrate of ferrite material having a permeability which is a decreasing function of the applied frequency;
three interconnected main strip conductors coated on said substrate and arranged in an equilateral triangle configuration;
an interconnecting lead connected at each apex of said triangle;
three one-eighth wavelength stub conductors coated on said substrate and intersecting the three sides of said triangle respectively, for locally circularly polarizing waves propagated along each of said main strip conductors;
three folded matching stub conductors coated on said substrate and intersecting said main strip for canceling the impedance of said one-eighth wavelength stubs;
means for establishing a magnetic field at the intersection of said one-eighth wavelength stubs with said main strips which field is weaker than the resonance field of said ferrite material; and
connectors connected to each of said interconnected leads.

References Cited

UNITED STATES PATENTS

| | | | |
|---|---|---|---|
| 3,387,231 | 6/1968 | Müller et al. | 333—1.1 |
| 3,447,143 | 5/1969 | Hair et al. | 333—24.1X |
| 3,448,409 | 6/1969 | Moose et al. | 333—1.1 |

OTHER REFERENCES

Lax et al.: "Microwave Ferrites and Ferrimagnetics," McGraw-Hill, N.Y., 1962, QC753L3, pp. 440, and 444 relied on.

Marriage et al.: "Some Non-Reciprocal Coaxial Devices At 2 gcls.," The IEE, June 1961, Part B Supplement-Int'l. Conf. on Components and Mat'ls. Used in Electronic Engineering, pp. 147, 148 relied on.

HERMAN KARL SAALBACH, Primary Examiner

P. L. GENSLER, Assistant Examiner

U.S. Cl. X.R.

333—24.2, 84